(12) United States Patent
Stevens

(10) Patent No.: US 6,256,263 B1
(45) Date of Patent: Jul. 3, 2001

(54) ACOUSTIC SENSING COUNTERMEASURE DEVICE AND METHOD OF DETERMINING A THREAT DIRECTION

(75) Inventor: Gerald T. Stevens, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/515,215

(22) Filed: Feb. 28, 2000

(51) Int. Cl.[7] ............................... H04K 3/00; G01S 3/80
(52) U.S. Cl. ............................... 367/1; 367/118; 367/129
(58) Field of Search .......................... 367/1, 3, 5, 118, 367/119, 124, 129, 153

(56) References Cited

U.S. PATENT DOCUMENTS

| | | | |
|---|---|---|---|
| 4,215,630 | * | 8/1980 | Hagelberg et al. .................. 102/10 |
| 5,339,281 | * | 8/1994 | Narendra et al. ................... 367/5 |
| 5,457,662 | * | 10/1995 | Forster .............................. 367/119 |
| 5,615,175 | * | 3/1997 | Carter et al. ....................... 367/124 |

\* cited by examiner

Primary Examiner—Ian J. Lobo
(74) Attorney, Agent, or Firm—Michael J. McGowan; Robert W. Gauthier; Prithvi C. Lall

(57) ABSTRACT

An acoustic sensing countermeasure device is used to sense the direction of a threat projectile or vehicle in addition to countering the threat with noise or interference signals. Countermeasure device includes an acoustic receive array comprised of segmented vertical staves preferably mounted within a reduced diameter section around the outside housing of the countermeasure device. The staves are grouped to form directional acoustic beams across the entire horizontal plane. To determine the direction of the acoustic signals from the threat projectile or vehicle, the countermeasure device uses a method wherein the direction is indicated by the output of the directional acoustic beams. The countermeasure device locates a known reference direction used to determine the bearing of the threat. The bearing information can be transmitted, for example, to the vessel that deployed the countermeasure. In one example, the countermeasure includes a compass and the compass heading of North is used as the reference direction. Alternatively, countermeasure device can detect the vessel or another countermeasure device and use that as the reference direction.

17 Claims, 3 Drawing Sheets

ACOUSTIC SENSING COUNTERMEASURE DEVICE AND METHOD OF DETERMINING A THREAT DIRECTION

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

This invention relates generally to acoustic signal detection and more particularly, to an acoustic sensing countermeasure device and a method of determining a threat direction.

(2) Description of the Prior Art

Countermeasures are commonly used to prevent a homing system from finding a submarine or other vessel. Countermeasures typically include acoustic devices deployed by the vessel to project either noise or an interference signal to mask or confuse a torpedo or other projectile or vehicle posing a threat to the vessel. Although existing countermeasures have been successful in countering threats and protecting vessels, the existing countermeasures do not have the capability of sensing and providing directional information of the threat being countered. Knowledge of the direction in which a threat projectile or vehicle is traveling can assist the submarine or vessel in evading the threat.

SUMMARY OF THE INVENTION

Accordingly, one object of the present invention is to provide a countermeasure capable of sensing a threat direction.

Another object of the present invention is a countermeasure capable of providing directional information to a vessel.

Another object of the present invention is a method of determining threat direction information and transmitting the threat direction information.

The present invention features a threat direction sensing countermeasure device comprising a countermeasure housing having a generally cylindrical shape and an acoustic receive array mounted around the countermeasure housing. The acoustic receive array includes a plurality of acoustic sensors for sensing acoustic signals representing a threat. The acoustic sensors are grouped to form directional acoustic beams for indicating a threat direction relative to the countermeasure device. The acoustic sensors are preferably arranged as segmented, vertical staves around the countermeasure housing. The countermeasure housing preferably has a reduced outer diameter section in which the acoustic receive array is mounted.

In one embodiment, the countermeasure device further comprises a direction location device coupled to the countermeasure housing for locating a known reference direction. The known reference direction and the threat direction can be used to determine a bearing of the threat represented by the acoustic signals. In one example, the direction location device is a compass and a compass heading of North is the known reference direction.

The countermeasure device preferably comprises a bearing signal transmitter for transmitting a bearing signal representing the bearing of the threat. In one example, the bearing signal is a coded signal transmitted with countermeasure interference signals.

The present invention also features a method of determining a threat direction. The method comprises deploying one or more acoustic sensing devices having acoustic sensors grouped to form directional acoustic beams; locating a known reference direction; linking the reference direction to a reference directional acoustic beam; receiving threat acoustic signals on one or more of the acoustic sensors; determining a threat directional acoustic beam based upon the acoustic sensors receiving the threat acoustic signals; and transmitting bearing information including the reference directional acoustic beam and the threat directional acoustic beam. Where the acoustic sensing device is a countermeasure deployed from a vessel, the countermeasure transmits countermeasure signals and the bearing information is transmitted as a coded signal with the countermeasure signals.

According to one method, the reference direction is located using a compass coupled to the acoustic sensing device where the compass heading of North is linked to the reference directional acoustic beam.

According to another method, the step of locating the reference direction includes receiving reference acoustic signals on one or more acoustic sensors from a signal source having a known location; and determining the reference directional acoustic beam based upon the acoustic sensors receiving the reference acoustic signals. Where the acoustic sensing device is a countermeasure deployed from a vessel, the vessel can be the signal source having the known location.

According to a further method, first and second acoustic sensing devices are deployed and each of the first and second acoustic sensing devices determine the known reference direction with respect to each other. Each of the first and second acoustic sensing devices also receive the threat acoustic signals and determine the threat direction acoustic beam.

BRIEF DESCRIPTION OF THE DRAWINGS

These and other features and advantages of the present invention will be better understood in view of the following description of the invention taken together with the drawings wherein like numerals indicate like parts and wherein.

DESCRIPTION OF THE PREFERRED EMBODIMENT

Figure 1:
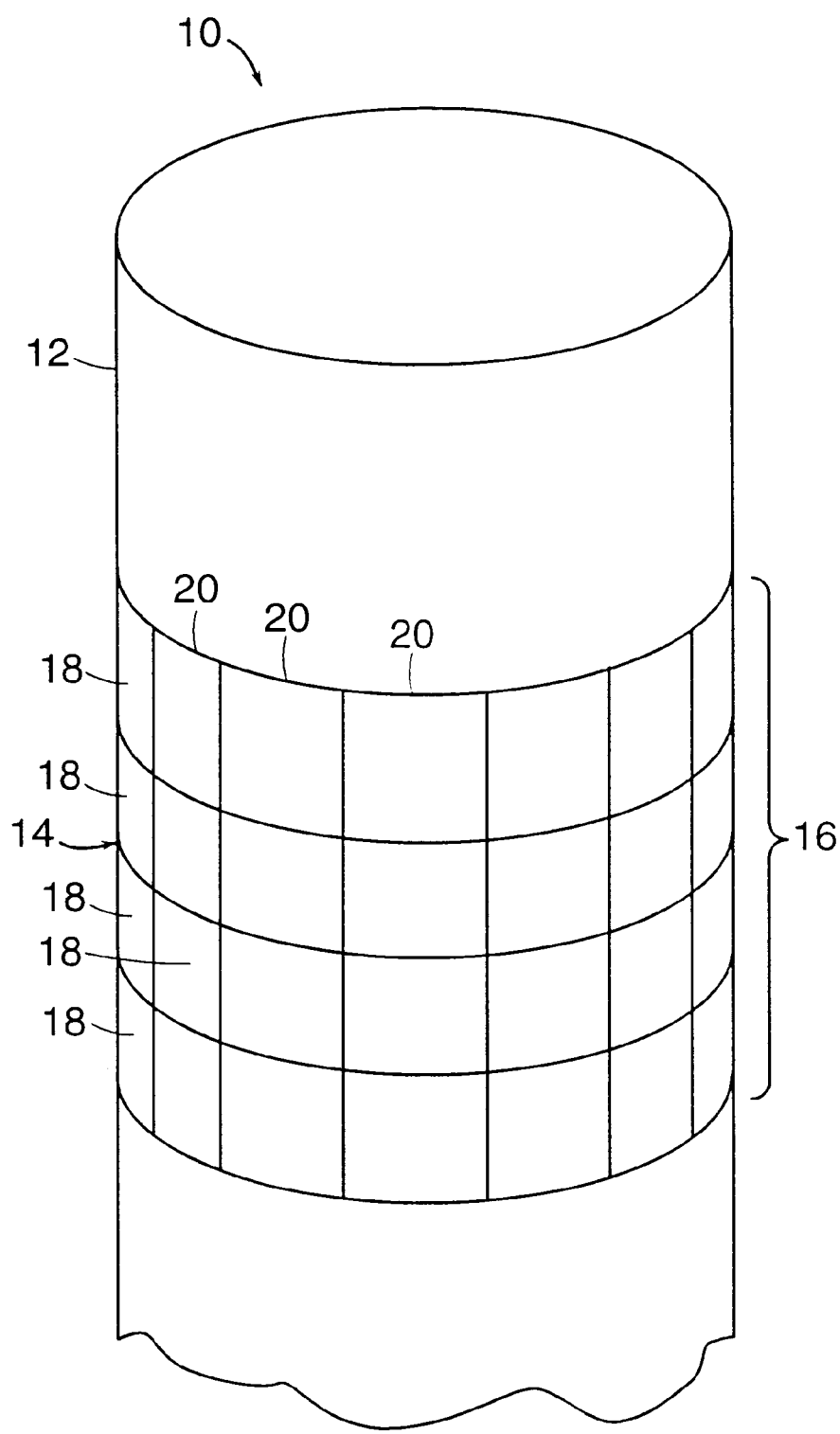
FIG. 1 is a partial perspective view of a countermeasure device having an acoustic receive array, according to the present invention.

A threat direction sensing countermeasure device 10, FIG. 1, according to the present invention, is capable of sensing a direction of a threat projectile, such as a torpedo, in addition to providing protection from the threat by transmitting countermeasure acoustic signals. The countermeasure device 10 provides countermeasure protection, such as transmitting countermeasure acoustic signals, according to any known techniques used in countermeasure devices. The countermeasure device 10 is preferably deployed from a vessel, such as a submarine, and the threat direction information is transmitted back to the vessel, as described in greater detail below. Although the exemplary embodiment is a countermeasure device, the concepts of determining a threat direction described below can be used with other types of acoustic sensing devices.

The countermeasure device 10 includes an outside countermeasure housing 12 having a generally cylindrical shape and an acoustic receive array 14 disposed around a section of the outside countermeasure housing 12. The acoustic receive array 14 is preferably a thin acoustic array such as the MULTI-LAYER ACOUSTICALLY TRANSPARENT SONAR ARRAY disclosed in U.S. Pat. No. 5,808,970, incorporated herein by reference. The outside housing 12 preferably includes a reduced outer diameter section 16 that receives the acoustic receive array 14 such that the acoustic receive array 14 blends with the outside contour of the countermeasure device 10. The acoustic receive array 14 is preferably made of a material that requires a minimal reduction in the countermeasure housing diameter, such as the 1–3 composite or polyvinylidene fluoride array material disclosed in U.S. Pat. No. 5,808,970. This reduces impact on the countermeasure diameter and facilitates implementation. In one example, the outside countermeasure housing 12 has a nominal diameter of about 6 in., although this is not a limitation on the present invention.

The acoustic receive array 14 preferably includes a plurality of acoustic sensors 18 arranged as segmented vertical staves 20 mounted around the outside of the housing 12. Each vertical stave 20 includes a vertical column of acoustic sensors 18. The acoustic sensors 18 sense acoustic signals representing the threat, such as active acoustic signals and radiated noise signatures of underwater vehicles. The acoustic sensors 18 generate electrical signals corresponding to the acoustic signals, which are processed, for example, using signal processing circuits within the acoustic receive array 14, as disclosed in U.S. Pat. No. 5,808,970. By summing the electrical signals from all of the staves 20, an omnidirectional receive pattern is produced in the horizontal plane.

Figure 2:
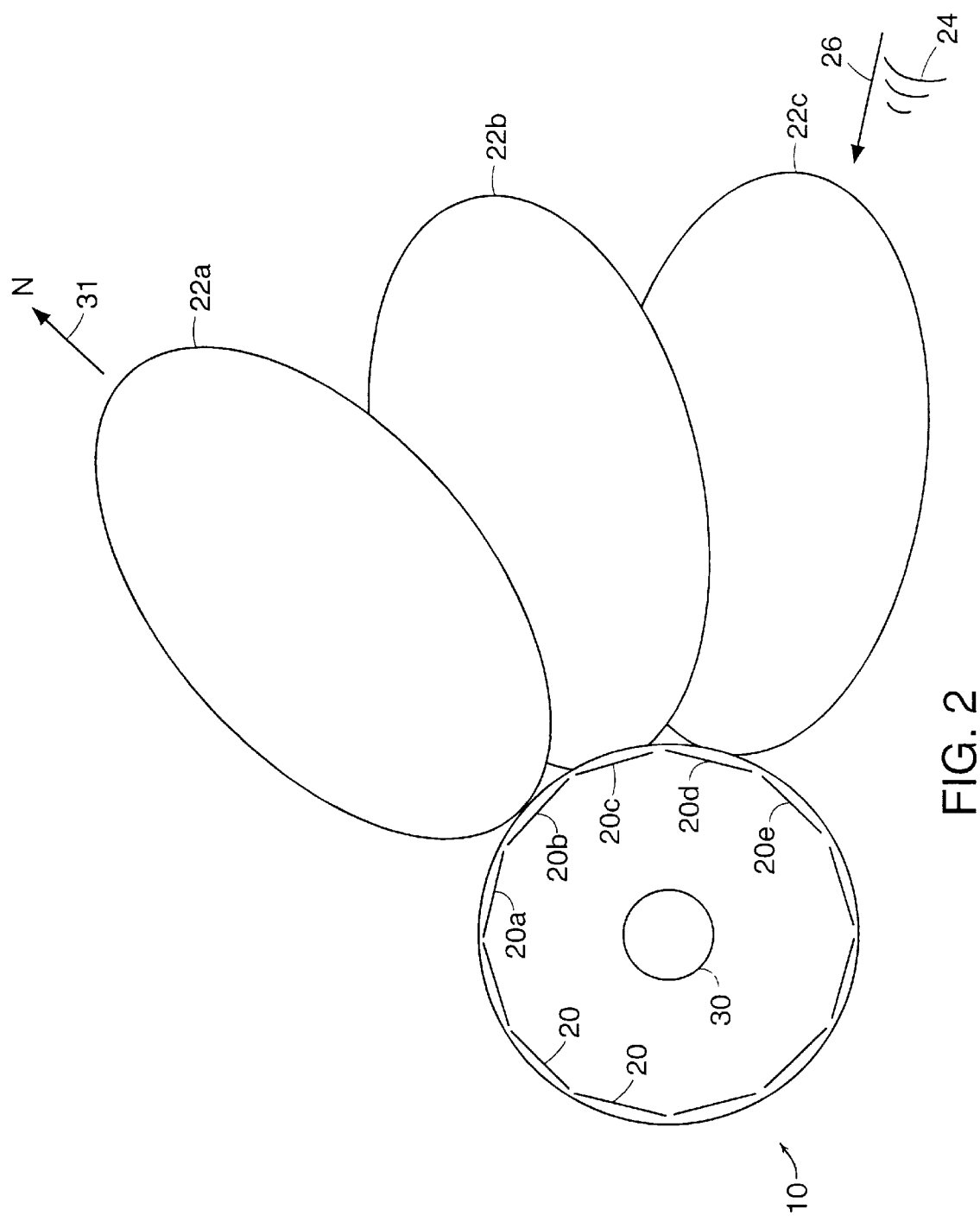
FIG. 2 is a schematic top view of the countermeasure device and directional acoustic beams formed by grouping acoustic sensors.

To achieve directionality in the horizontal plane, the vertical staves 20, FIG. 2, are grouped in each direction of interest to form fixed directional acoustic beams 22. For example, directional acoustic beam 22a is formed by summing staves 20a, 20b, 20c; directional acoustic beam 22b is formed by summing staves 20b, 20c, 20d; and directional acoustic beam 22C is formed by summing staves 20c, 20d, 20e. Although three directional acoustic beams 22a–c are shown, the grouping of all of the staves 20 can be varied to form directional acoustic beam patterns across the entire horizontal plane of the countermeasure device 10.

By monitoring the summed acoustic output from each of the directional acoustic beams 22 and comparing the output, the beam with the high energy signal is determined to be oriented toward the threat signals. For example, if acoustic signals 24 travel from the threat direction 26, the summed acoustic output of staves 20c, 20d, 20e will have the highest energy and directional acoustic beam 22c will be the threat directional acoustic beam oriented in the threat direction 26. Once the general threat direction relative to the countermeasure device 10 (i.e., the threat directional acoustic beam) is known, bearing information can be determined by locating or determining a known reference direction, as will be described in greater detail below.

According to one embodiment, the countermeasure device 10 includes a direction location device 30, such as a compass, that locates a known reference direction such as the compass heading of North, as indicated by arrow 31. Other direction location devices can also be used. The known reference direction 31 is linked to a directional acoustic beam 22a having the same general direction (i.e., the reference directional acoustic beam). The relative direction or bearing of the threat can be determined from the reference directional acoustic beam 22a oriented toward the North direction 31 and the threat directional acoustic beam 22c oriented toward the threat direction 26.

Figure 3:
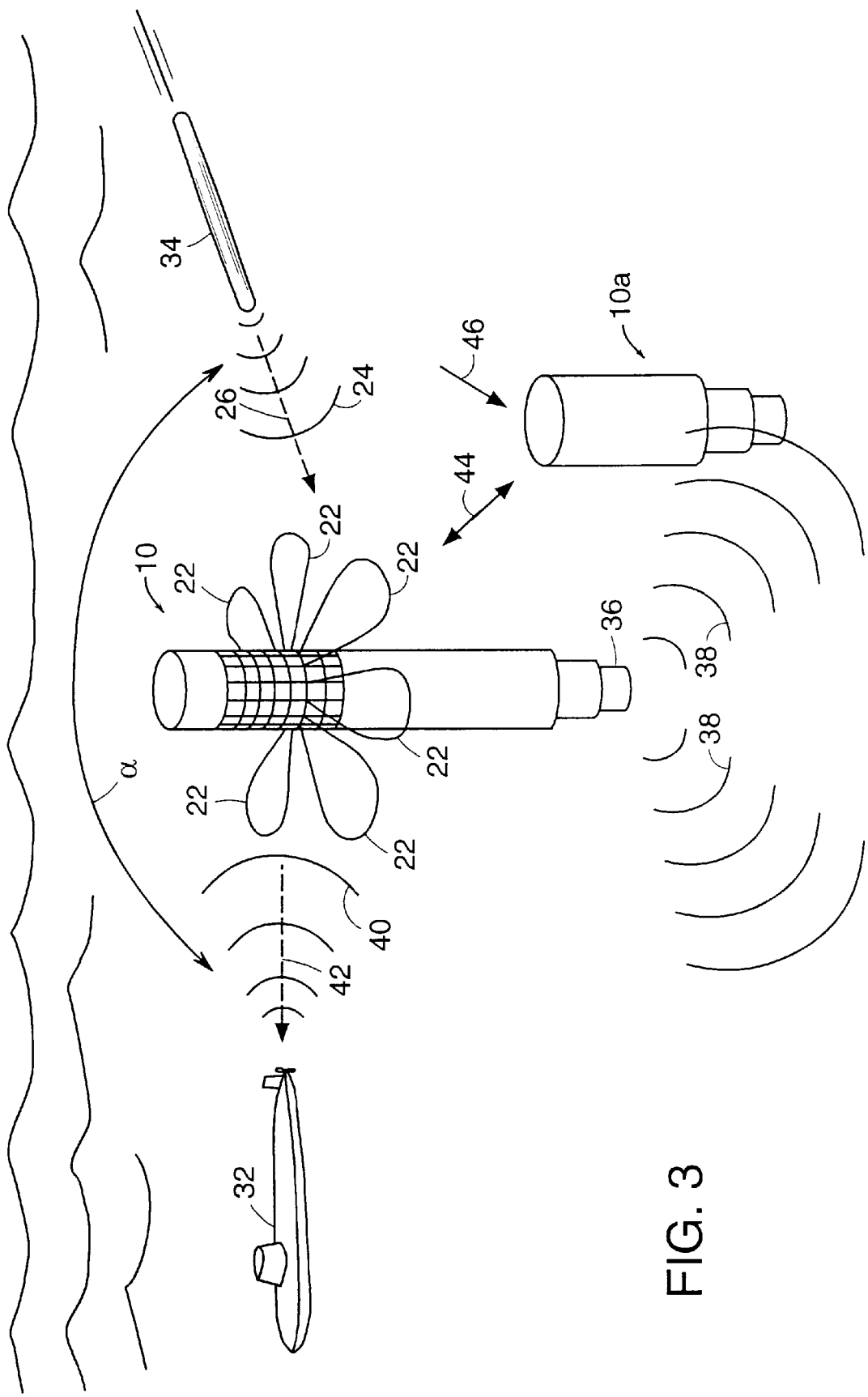
FIG. 3 is a schematic diagram of the threat direction sensing countermeasure device being used to determine a threat direction.

In use, the countermeasure device 10, FIG. 3, is deployed from a submarine 32 or other vessel. The countermeasure device 10 floats generally vertically in the water such that directional acoustic beams 22 provide 360 degree coverage in the horizontal plane. A threat torpedo 34 or other projectile or vehicle generates the acoustic signals 24 traveling generally in the threat direction 26. The countermeasure device 10 senses the acoustic signals 24 and determines the threat direction 26 as described above. The threat direction 26 together with the known reference direction provide angular or bearing information pertaining to the threat torpedo 34.

The countermeasure device 10 preferably includes a transmitter 36 for transmitting the bearing information (e.g., the reference directional acoustic beam and the threat directional acoustic beam). The bearing information can be transmitted to the vessel 32 that deployed the countermeasure device 10 or to any other location. In one example, the transmitter 36 is a noise/interference projector that projects countermeasure noise/interference signals 38, and the bearing information is transmitted as a coded signal with the countermeasure signals 38. The coded signal preferably identifies the reference directional acoustic beam and the threat directional acoustic beam, which indicate the angle between the reference direction and threat direction. By monitoring the bearing information, the vessel 32 can determine when a threat torpedo 34 or vehicle passed the countermeasure device 10 and is moving away from it.

The known reference direction can also be located or determined without using the direction location device 30. In one example, the countermeasure device 10 detects acoustic signals 40 from the vessel 32, such as the evading submarine, and uses the bearing of the vessel 32 as the known reference direction 42. Using this known reference direction 42, the relative threat angle αbetween the vessel direction 42 and the threat direction 26 can be determined.

According to another example, at least first and second countermeasure devices 10, 10a are deployed. Each of the countermeasure devices 10, 10a determine a reference direction 44 relative to the other countermeasure device. Each of the countermeasure devices 10, 10a also determine the respective threat directions 26, 46 relative to that countermeasure device 10, 10a. Using bearing information from two countermeasure devices 10, 10a and triangulation techniques, threat range information can be determined.

Accordingly, the present invention provides countermeasure devices with the capability of sensing and providing directional information of a threat being countered.

In light of the above, it is therefore understood that within the scope of the appended claims, the invention may be practiced otherwise than as specifically described.

What is claimed is:

1. A threat direction sensing countermeasure device comprising:
   a countermeasure housing having a generally cylindrical shape; and
   an acoustic receive array mounted around said countermeasure housing, wherein said acoustic receive array includes a plurality of acoustic sensors for sensing acoustic signals representing a threat, wherein said plurality of acoustic sensors are arranged as segmented vertical staves around said countermeasure housing and wherein said acoustic sensors are grouped to form directional acoustic beams for indicating a threat direction of said acoustic signals relative to said countermeasure device.

2. The threat direction sensing countermeasure device of claim 1 further comprising a direction location device coupled to said countermeasure housing for locating a known reference direction, wherein said reference direction and said threat direction are used to determine a bearing of said threat represented by said acoustic signals.

3. The threat direction sensing countermeasure device of claim 2 wherein said direction location device is a compass, and wherein said reference direction is a compass heading of North.

4. The threat direction sensing countermeasure device of claim 2 further comprising a bearing signal transmitter for transmitting a bearing signal representing said bearing of said threat.

5. The threat direction sensing countermeasure device of claim 4 wherein said bearing signal is encoded.

6. The threat direction sensing countermeasure device of claim 5 wherein said bearing signal is transmitted with countermeasure interference signals.

7. The threat direction sensing countermeasure device of claim 1 wherein said countermeasure housing has a reduced outer diameter section, and wherein said acoustic receive array is mounted in said reduced outer diameter section.

8. The threat direction sensing countermeasure device of claim 1 wherein said directional acoustic beams are formed across the entire horizontal plane.

9. A threat direction sensing countermeasure device comprising:

a countermeasure housing having a generally cylindrical shape;

an acoustic receive array mounted around said countermeasure housing, wherein said acoustic receive array includes a plurality of acoustic sensors for sensing acoustic signals representing a threat, and wherein said acoustic sensors are grouped to form directional acoustic beams, the directional acoustic beam having a highest energy signal indicating said threat direction;

a direction location device coupled to said countermeasure housing, for locating a reference direction linked to one of said acoustic beams; and a bearing signal transmitter, for transmitting a coded bearing signal with countermeasure signals transmitted by said countermeasure device, said coded bearing signal representing said reference direction and said threat direction.

10. A threat direction sensing countermeasure device of claim 9 wherein said direction location device includes means for determining a reference directional acoustic beam based upon at least one reference acoustic signal received on at least one of said acoustic sensors from a signal source having a known location.

11. A method of acquiring and transmitting threat direction information, comprising the steps of:

deploying a countermeasure device including at least one acoustic sensors device having an acoustic array including acoustic sensors grouped to form directional acoustic beams across the entire horizontal plane;

locating a reference direction;

linking said reference direction to a reference directional acoustic beam of said directional acoustic beams;

receiving threat acoustic signals on at least one of said acoustic sensors;

determining a threat directional acoustic beam of said directional acoustic beams based upon said acoustic sensors receiving said threat acoustic signals; and transmitting bearing information including said reference directional acoustic beam, wherein said bearing information is transmitted as a coded signal with countermeasure signals transmitted by said countermeasure device.

12. The method of claim 11 wherein the step of locating said reference direction is performed with a compass coupled to said acoustic sensing device, and wherein the compass heading of North is linked to said reference directional acoustic beam.

13. The method of claim 11 wherein the step of locating a reference direction includes the steps of:

receiving reference acoustic signals on at least one of said acoustic sensors from a signal source having a known location; and determining said reference directional acoustic beam based upon said at least one of said acoustic sensors receiving said reference acoustic signals.

14. The method of claim 13 wherein:

said acoustic sensing device is a countermeasure deployed from a vessel; and said vessel is said signal source having said known location.

15. The method of claim 11 wherein:

at least first and second acoustic sensing devices are deployed;

each of said first and second acoustic sensing devices determine said reference direction with respect to each other; and each of said first and second acoustic sensing devices receive said threat acoustic signals and determine said threat directional acoustic beam.

16. A method of acquiring and transmitting threat direction information, comprising the steps of:

deploying at least one acoustic sensing device having an acoustic array including acoustic sensors grouped to form directional acoustic beams across the entire horizontal plane;

receiving reference acoustic signals on at least one of said acoustic sensors from a signal source having a known location;

determining a reference directional acoustic beam based upon said at least one of said acoustic sensors receiving said reference acoustic signals;

receiving threat acoustic signals on at least one of said acoustic sensors;

determining a threat directional acoustic beam of said directional acoustic beams based upon said acoustic sensors receiving said threat acoustic signals; and transmitting bearing information including said reference directional acoustic beam and said threat directional acoustic beam.

17. The method of claim 16 wherein:

said acoustic sensing device is a countermeasure device deployed from a vessel; and said vessel is said signal source having said known location.

* * * * *